United States Patent
Kennedy, Jr.

(10) Patent No.: US 10,492,067 B2
(45) Date of Patent: Nov. 26, 2019

(54) SECURE ACCESS AUTHORIZATION METHOD

(71) Applicant: Siemens Industry, Inc., Alpharetta, GA (US)

(72) Inventor: Allen Kennedy, Jr., Christiansted, VI (US)

(73) Assignee: Siemens Industry, Inc., Alpharetta, GA (US)

(*) Notice: Subject to any disclaimer, the term of this patent is extended or adjusted under 35 U.S.C. 154(b) by 246 days.

(21) Appl. No.: 15/355,520

(22) Filed: Nov. 18, 2016

(65) Prior Publication Data

US 2018/0146369 A1    May 24, 2018

(51) Int. Cl.
| | |
|---|---|
| *H04W 12/06* | (2009.01) |
| *H04W 12/04* | (2009.01) |
| *H04W 12/08* | (2009.01) |
| *H04L 29/06* | (2006.01) |
| *H04L 9/32* | (2006.01) |
| *H04W 12/00* | (2009.01) |

(52) U.S. Cl.
CPC ........... *H04W 12/06* (2013.01); *H04L 9/3213* (2013.01); *H04L 63/068* (2013.01); *H04W 12/04* (2013.01); *H04W 12/08* (2013.01); *H04L 2209/80* (2013.01); *H04W 12/00502* (2019.01)

(58) Field of Classification Search
CPC ..... H04W 12/06; H04W 12/08; H04W 12/04; H04W 12/00502; H04L 9/3213; H04L 63/068; H04L 2209/80
See application file for complete search history.

(56) References Cited

U.S. PATENT DOCUMENTS

| | | | | |
|---|---|---|---|---|
| 9,641,521 | B2* | 5/2017 | Egan | H04L 63/0853 |
| 9,852,562 | B2* | 12/2017 | Belhadia | E05B 47/0615 |
| 2005/0262132 | A1* | 11/2005 | Morita | G06F 21/6218 |
| 2006/0214767 | A1* | 9/2006 | Carrieri | G07C 9/00158 |
| | | | | 340/5.61 |
| 2014/0009609 | A1* | 1/2014 | Webster | H04N 7/183 |
| | | | | 348/143 |
| 2014/0068705 | A1* | 3/2014 | Chambers | H04L 63/08 |
| | | | | 726/1 |
| 2014/0120905 | A1* | 5/2014 | Kim | H04W 12/06 |
| | | | | 455/426.1 |
| 2014/0331060 | A1* | 11/2014 | Hayton | G06F 21/31 |
| | | | | 713/186 |
| 2015/0134968 | A1* | 5/2015 | Outwater | G06Q 30/06 |
| | | | | 713/175 |
| 2016/0036788 | A1* | 2/2016 | Conrad | G07C 9/00571 |
| | | | | 713/168 |

(Continued)

*Primary Examiner* — Michael R Vaughan

(57) ABSTRACT

Credentialing systems, methods, and mediums. A method includes sending, by a mobile device and over a network to an installed device, a request for access to the installed device. The method includes receiving, in response to the request, an encrypted token from the installed device. The method includes performing an authentication process with a credentialing server using the token, wherein the credentialing server decrypts the token. The method includes receiving, from the credentialing server, a validation key corresponding to the installed device. The method includes communicating, by the mobile device, with the installed device using the validation key.

20 Claims, 4 Drawing Sheets

(56) References Cited

U.S. PATENT DOCUMENTS

| | | | |
|---|---|---|---|
| 2016/0092696 A1* | 3/2016 | Guglani | G06F 21/335 726/26 |
| 2016/0116510 A1* | 4/2016 | Kalous | G07C 9/00571 340/636.1 |
| 2016/0156604 A1* | 6/2016 | Oh | H04L 63/08 726/4 |
| 2017/0003979 A1* | 1/2017 | Keyser | H04L 63/062 |
| 2017/0091699 A1* | 3/2017 | Mueller | G06Q 10/083 |
| 2019/0158353 A1* | 5/2019 | Johnson | H04L 41/0803 |

* cited by examiner

SECURE ACCESS AUTHORIZATION METHOD

TECHNICAL FIELD

The present disclosure is directed, in general, to building management systems and, more particularly, to credentialing of users in building management systems and other systems.

BACKGROUND OF THE DISCLOSURE

Building automation systems encompass a wide variety of systems that aid in the monitoring and control of various aspects of building operation. Building automation systems include security systems, fire safety systems, lighting systems, and HVAC systems. The elements of a building automation system are widely dispersed throughout a facility. For example, an HVAC system may include temperature sensors and ventilation damper controls, as well as other elements that are located in virtually every area of a facility. These building automation systems typically have one or more centralized control stations from which system data may be monitored and various aspects of system operation may be controlled and/or monitored.

To allow for monitoring and control of the dispersed control system elements, building automation systems often employ multi-level communication networks to communicate operational and/or alarm information between operating elements, such as sensors and actuators, and the centralized control station. Further, maintenance, auditing, and other activities often require access to on-site systems by occasional users that require credentials with limited access to specific sites or devices. In an "Internet of things" environment, various devices within the building automation systems, or in other contexts, may be directly-accessible for maintenance, diagnostic, and other purposes. Specific devices, in particular, may need to be accessed but may not include robust authentication and network capabilities.

SUMMARY OF THE DISCLOSURE

Various disclosed embodiments relate to systems and methods for authenticating access to an installed device, such as (but not limited to) an Internet-of-things device in a building management system. A method includes sending, by a mobile device and over a network to an installed device, a request for access to the installed device. The method includes receiving, in response to the request, an encrypted token from the installed device. The method includes performing an authentication process with a credentialing server using the token, wherein the credentialing server decrypts the token. The method includes receiving, from the credentialing server, a validation key corresponding to the installed device. The method includes communicating, by the mobile device, with the installed device using the validation key.

Another embodiment includes credentialing system that has an installed device, a credentialing server, and a mobile device capable of communicating with the installed device and the credentialing server. The mobile device includes a storage device comprising a credentialing application, an accessible memory comprising instructions of the credentialing application, and a processor configured to execute the instructions of the credentialing application to perform processes as described herein.

In various embodiments, the request includes initial credentials, and wherein the installed device stores a table of valid initial credentials. In various embodiments, the request includes initial credentials, and the encrypted token is only received if the initial credentials are authenticated by the installed device. In various embodiments, the token includes at least one of an identifier of the installed device, and identifier of initial credentials used in the request, an identifier of the mobile device, a time or date of the request, of a level of access included in the request. In various embodiments, the authentication process includes sending the token to the credentialing server to be decrypted, and also include sending user credentials to the credentialing server for authentication. In various embodiments, the authentication process includes sending user credentials to the credentialing server for authentication, and the validation key is only received if the user credentials are successfully authenticated and the validation key is successfully decrypted. In various embodiments, the authentication key is valid for only a predetermined amount of time after the request is sent. In various embodiments, the authentication key is a Rivest-Shamir-Adleman (RSA) encryption key that can be used to access the installed device via secure shell (SSH) protocol. In various embodiments, the installed device is an Internet of things (IoT) device in a building management system. In various embodiments, the installed device stores a table of active authentication keys and data indicating expiration of each active authentication key.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
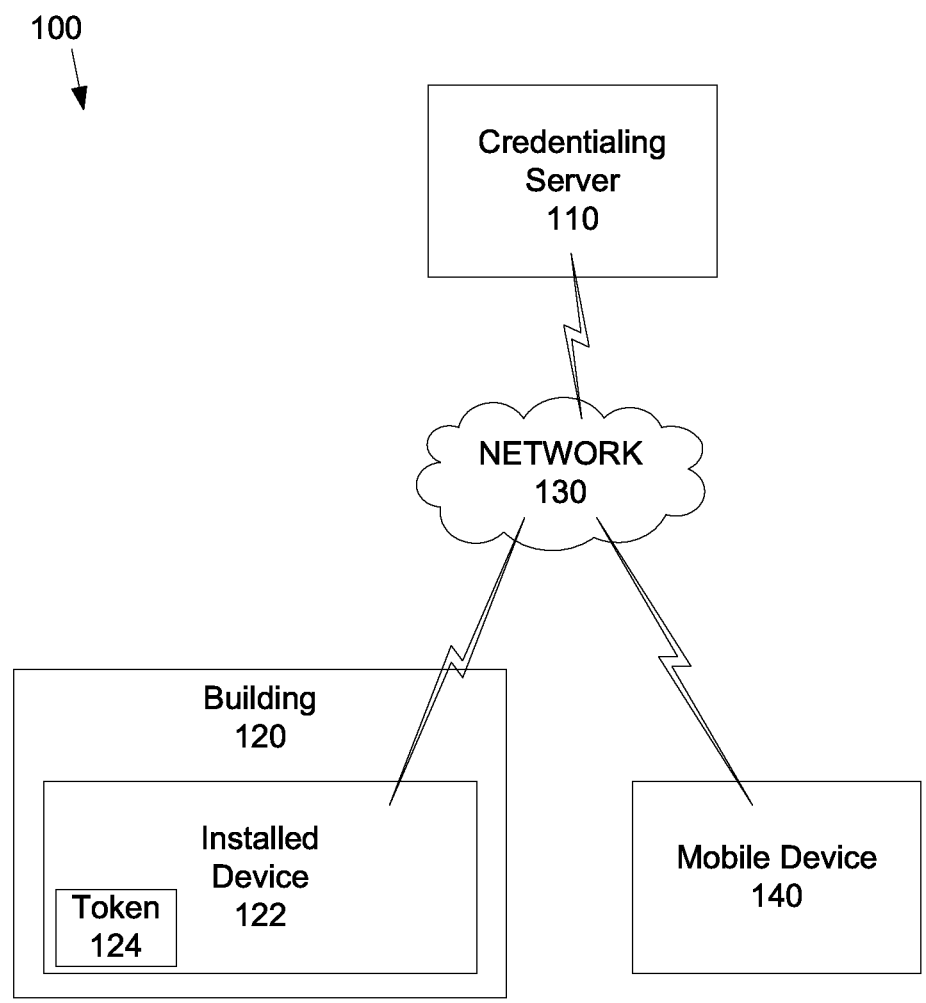
FIG. 1 illustrates a block diagram of a credentialing system in which various embodiments of the present disclosure are implemented.

FIGS. 1 through 4B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Embodiments of the present disclosure provide login credentials to mobile devices or other systems for intermittent or temporary users who are using the computer systems to access particular installed devices that may not include robust authentication services or full Internet connectivity. For example, an HVAC repair technician may be dispatched to a particular customer site to fix an HVAC system and therefore require access to any HVAC automation systems. Disclosed embodiments can apply to any such location and system or device, referred to herein as a "site". Managing credentials for such access using conventional methods is expensive and time consuming and may not be supported by the installed devices themselves, particularly in an Internet-of-Things context.

The Internet of things (IoT), refers to the internetworking of physical devices, vehicles (also referred to as "connected devices" and "smart devices"), buildings and other items—embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each thing is uniquely identifiable through its embedded computing system but is able to interoperate within the existing Internet infrastructure. Disclosed embodiments can include IoT devices as the "installed device" described herein, and those installed devices can in particular include installed sensors, actuators, and other devices in a building management or automation system.

Disclosed embodiments allow a user (or, more specifically, a user's device) to receive a token from an installed device, validate the token with a credentialing server, and subsequently access the installed device using a key or code received from the credentialing server. Where the installed device may not have capabilities to securely authenticate each user itself, it can rely on the key or code generated by the credentialing server and delivered by the user's device to ensure that the user is properly authenticated. In many cases, the installed device is only capable of very simple secured communications, such as by using the secure shell (SSH) cryptographic network protocol. Disclosed embodiments can allow robust authentication of the user's device by the credentialing server to provide SSH access to the installed device.

FIG. 1 illustrates a block diagram of a credentialing system 100 in which various embodiments are implemented. In this illustrative embodiment, the credentialing system 100 includes a credentialing server 110 connected, via a network 130, to installed device 122 disposed in or in proximity to a building 120. Such an installed device 122 can be an HVAC system, lighting system, security system, or any other system using credentialing processes as described herein, or another device or component that does so. Credentialing server 110 may perform any number of other functions in addition to the credentialing functions described herein. Installed device 122 can store an encrypted token 124 (or an unencrypted token 124, which is encrypted before being transmitted). For example, credentialing server 110 can also function as an overall management system for a plurality of installed devices 122. Note that, while this exemplary embodiment places installed device 122 in or in proximity to a building 120, such an arrangement is not required in all implementations.

The network 130 is a medium used to provide communication links between various data processing systems and other devices in the credentialing system 100. Network 130 may include any number of suitable connections, such as wired, wireless, or fiber optic links. Network 130 may be implemented as a number of different combinations of types of networks, such as, for example, the internet, a local area network (LAN), or a wide area network (WAN).

Mobile device 140 communicates over network 130 with installed device 122 and credentialing server 110. Mobile device 140 can be implemented as a smartphone, tablet computer, laptop computer, or other device that is configured to perform processes as described herein, and may also be referred to herein as the "user's device." In a typical implementation, mobile device 140 is used by a user that requires specific credentials to access installed device 122 as described herein. Note that while, in a typical implementation, the "mobile device" will indeed be a mobile electronic device, in alternate implementations, any data processing system can act as the "mobile device," whether that data processing system is actually mobile or not.

Figure 2:
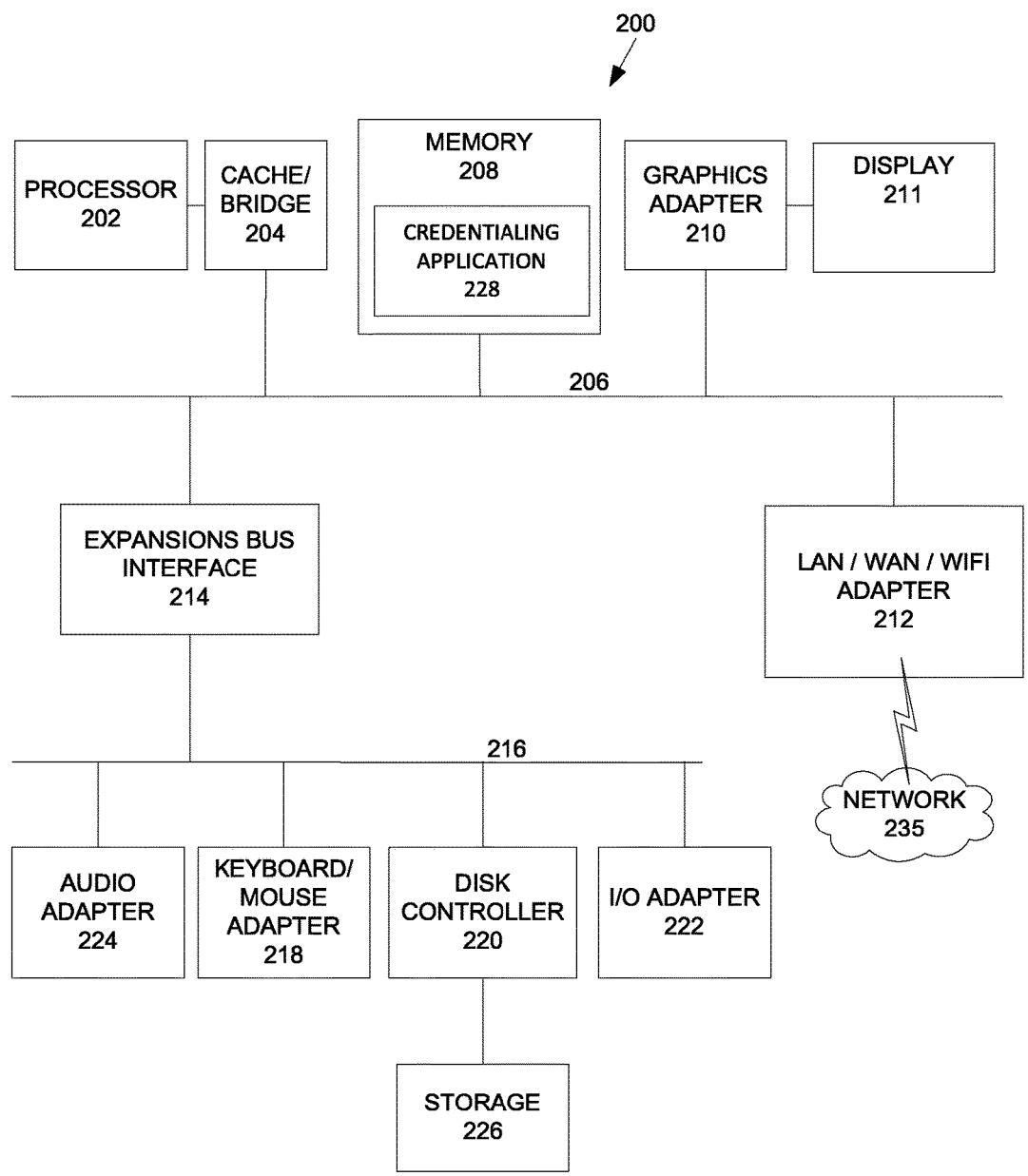
FIG. 2 depicts a block diagram of a data processing system in which various embodiments are implemented.

FIG. 2 depicts a block diagram of a data processing system 200 in which various embodiments are implemented. The data processing system 200 is an example of one implementation of the data processing system mobile device 140 in FIG. 1, and such a data processing system can also be used to implement portions of installed device 122 or credentialing server 110 in various embodiments.

The data processing system 200 includes a processor 202 connected to a level two cache/bridge 204, which is connected in turn to a local system bus 206. The local system bus 206 may be, for example, a peripheral component interconnect (PCI) architecture bus. Also connected to local system bus in the depicted example are a main memory 208 and a graphics adapter 210. The graphics adapter 210 may be connected to a display 211. Memory 208 can store an executable credentialing application 228 that causes the data processing system 200 to perform processes as described herein.

Other peripherals, such as a local area network (LAN)/Wide Area Network/Wireless (e.g. WiFi) adapter 212, may also be connected to local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or touch screen panel. In these embodiments, elements of the keyboard/mouse adapter 218 may be implemented in connection with the display 211.

Those of ordinary skill in the art will appreciate that the hardware depicted in FIG. 2 may vary for particular implementations. For example, other peripheral devices, such as an optical disk drive and the like, also may be used in addition or in place of the hardware depicted. In other cases, for example when implementing mobile device 140, data processing system 200 may include a touchscreen input, fingerprint reader or other biometric devices, or a location device such as a global positioning system (GPS) receiver, and may be implemented in a portable form factor with integrated components. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash., the Android operating system, or the iOS operating system may be employed. The operating system may modified or created in accordance with the present disclosure as described, for example, to implement the credentialing functions of one or more devices in a building.

LAN/WAN/Wireless adapter 212 may be connected to a network 235, such as network 130. As further explained below, the network 235 may be any public or private data processing system network or combination of networks, as known to those of skill in the art, including the Internet. Data processing system 200 may communicate over network 235 to one or more computers, which are also not part of data processing system 200, but may be implemented, for example, as a separate data processing system 200.

Disclosed embodiments provide a technical advantage over previous systems, in that they use an external trusted credentialing server for token decryption, and use a returned encrypted token, key, or code from the mobile device. Existing solutions generally involve factory resets, manufacturer intervention, physical access to the device, or an unsecure method of transferring authentication keys. Disclosed embodiments allow for an encrypted key ("token") to be acquired from the installed device via an application program interface (API) call. The encrypted key is then sent to a trusted credentialing server where it is then decrypted. The credentialing server returns to the mobile device a key that the mobile device then uses on the remote device. The encrypted key, in some embodiments, also holds information regarding when the access was made, and specific information regarding the identity of the device in order to help track when and from where the access is being requested.

Figure 3:
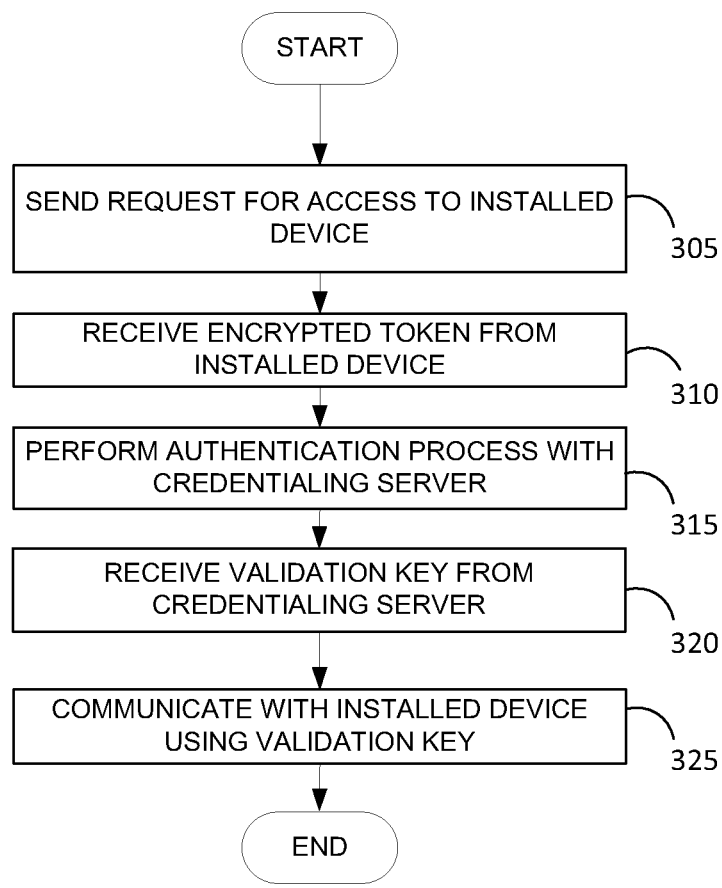
FIG. 3 illustrates a flowchart of a process for credentialing in accordance with disclosed embodiments.

FIG. 3 illustrates a flowchart of a process for credentialing in accordance with disclosed embodiments, and in particular for interacting with a limited-capability IoT installed device using authentication processes provided by a credentialing server as described herein. This process may be performed, for example, in one or more data processing systems, such as, for example, the data processing system 200, configured to perform acts described below, referred to in the singular as "the mobile device," and which can act as the mobile device described herein. The process may be implemented by executable instructions stored in a non-transitory computer-readable medium that cause one or more data processing systems to perform such a process. For example, the credentialing application 228 in the mobile device may comprise the executable instructions to cause one or more data processing systems to perform such a process, and can comprise a look-up table or other structure that stores data to implement the disclosed processes.

Similarly, while the primary process of FIG. 3 is described specifically in terms of processes performed by the mobile device in communication with the installed device and the credentialing server, complementary processes are performed by the installed device and the credentialing server, as described below. The installed device and credentialing server can be each be implemented by appropriate hardware, such as a data processing system 200, and can include executable instructions and data structures used to implement the processes of the respective devices or systems.

When the user of the mobile device desires to access the installed device, the mobile device sends a request for access to the installed device over a network as described herein (305). This can include receiving, by the mobile device, a user input instructing the mobile device to request access to the installed device. The request can be made by the mobile device, over the network, to an application program interface (API) of the installed device. The request can be made over a secure SSH or HTTP connection to the installed device.

The request can include initial credentials, such as a username and password of the user, a generic or administrative username and password that is specifically designated for such requests, or other credential. In particular cases, this can include the mobile device receiving, from the user, the initial credentials and thereafter sending the initial credentials to the installed device as part of the request. Note that it is specifically considered that the initial credentials can be "weak" credentials such as shared or generic credentials used to request access to the installed device, since the initial credentials are used for this request process and do not actually grant access to the installed device, and such "weak" credentials may be easily supported by the installed device even if it does not have a robust security system or specific credentials for each possible user. The request can include other information, such as an identifier of the installed device (MAC address or otherwise), an identifier of the mobile device (MAC address or otherwise), the level of access to the installed device that is requested, or other information.

Figure 4A:
FIG. 4A illustrates an example of an initial credential table that may be stored in a memory of an installed device in accordance with disclosed embodiments.

FIG. 4A illustrates an example of an initial credential table 402 that may be stored in a memory of the installed device. This table can store valid initial credentials 404 such as multiple USER names, associated PASSWORDs and associated ACCESS LEVELS. Of course, other or additional information can be stored.

The mobile device receives, in response to the request, an encrypted token from the installed device (310). This response can be conditioned on the installed device properly authenticating the initial credentials. The token can be, for example, a string of base64 encoded characters, or other encrypted data. The token can include, in encrypted form, such information as an identifier of the installed device (MAC address or otherwise), an identifier of the credentials used in the request, an identifier of the mobile device (MAC address or otherwise), the time or date of the request, the level of access included in the request, or other information.

The mobile device performs an authentication process with the credentialing server using the token (315). The authentication process includes sending the token to the credentialing server. The authentication process can also include sending user credentials to the credentialing server, such as a username, password, biometric information, or other information, so that the user or mobile device can be independently authenticated using more robust techniques than the installed device may be capable of. As part of the authentication process, the credentialing server decrypts the token and validates the user credentials. Decrypting the token can include extracting any information included in the token, such as the identifier of the installed device (MAC address or otherwise), the identifier of the credentials used in the request, the time or date of the request, the level of access included in the request, or other information. The credentialing server can store any of this data.

If the decryption fails or the user credentials cannot be validated, the process can stop.

If the decryption is successful and the user credentials are validated, then the credentialing server sends, and the mobile device receives, a validation key corresponding to the installed device (320). In some embodiments, the validation key is a Rivest-Shamir-Adleman (RSA) encryption key that can be used to access the installed device via the SSH protocol. In other embodiments, the validation key is any other key that can be used to encrypt communications between the mobile device and the installed device, or can be used to validate communications between the mobile device and the installed device. The validation key can be specific to the level of access granted for the mobile device to access the installed device, and can be dependent on other factors, such as the time of day, location of the mobile device (as determined, for example, from GPS data or IP address data), or other factors.

The mobile device thereafter communicates with the installed device using the validation key (325). In some embodiments, this is performed using the validation key to communicate with the installed device via the SSH protocol, wherein the validation key is used to encrypt the communications.

In specific embodiments, the validation key is included in the encrypted token, and is extracted from the encrypted token when the token is decrypted by the credentialing server. It is then returned to the mobile device to be used to communicate with the installed device.

In specific embodiments, the validation key is generated or produced by the installed device at the time it receives the request. The installed device stores, in a memory, the validation key and the time/date of the request. The installed device, in these embodiments, will or can only communicate using that validation key within a predetermined time from the request. For example, after a "time-out period" such as 24 hours, the installed device can delete the request and the corresponding validation key from the memory, so that any attempt by the mobile device (or any other device) after the time-out period to communicate using that validation key is unsuccessful. By refusing to communicate using an expired validation key, the installed device is secured against an "old" validation key being obtained and used by an unauthorized user. Further, the encrypted token cannot be "hacked" or brute-force decrypted in such a limited time, and so any validation key associated with such a hacked token will have expired before it could be used.

Figure 4B:
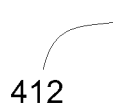
FIG. 4B illustrates an example of an active key table in accordance with disclosed embodiments that may be stored in a memory of the installed device.

FIG. 4B illustrates an example of an active key table 410 in accordance with disclosed embodiments that may be stored in a memory of the installed device. This table can store active validation keys 412 including such information as multiple USER names, associated mobile DEVICE identifiers, associated KEYs, and associated KEYDATEs. Of course, other or additional information can be stored. In this example, a mobile device with a MAC address as shown has requested a token using username FULL_USER. The installed device has issued a validation key KEY1 at the date and time specified by KEYDATE. KEY1 is valid for a predetermined time, such as 24 hours, after the KEYDATE. During that period, the mobile device can communicate with the installed device using KEY1 with an access level as specified for that USER in the initial credential table 402. Active keys can form all or part of the encrypted token 124.

In various embodiments, one or more of these processes can be "invisible" to the user of the mobile device. For example, the mobile device may have pre-stored initial credentials for communicating with the installed device, so that the user does not have to enter any credentials at this point. The user may only be required to enter his own credentials once, and the mobile device can then automatically interact with both the installed device and the credentialing server to complete the authentication processes as described, without requiring further interaction with the user until the mobile device is fully "logged in" to the installed device.

Of course, those of skill in the art will recognize that, unless specifically indicated or required by the sequence of operations, certain steps in the processes described above may be omitted, combined, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 200 or the other systems described herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

The description in the present application should not be read as implying that any particular element, step, or function is an essential or critical element which must be included in the claim scope: the scope of patented subject matter is defined only by the allowed claims. Moreover, none of these claims are intended to invoke 35 USC § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

What is claimed is:

1. A method performed by a credentialing system, comprising:
   sending, by a mobile device and over a network to an installed device, a request for access to the installed device;
   receiving, by the mobile device, an encrypted token from the installed device in response to the request, the encrypted token including a validation key;
   performing an authentication process with a credentialing server using the token, wherein performing the authentication process comprises:
      sending, by the mobile device, the token to the credentialing server; and
      decrypting the token at the credentialing server, decrypting the token including extracting the validation key from the encrypted token;
   receiving, from the credentialing server, a validation key corresponding to the installed device in response to decrypting the token; and
   communicating, by the mobile device, with the installed device using the validation key.

2. The method of claim 1, wherein the request includes initial credentials, and wherein the installed device stores a table of valid initial credentials.

3. The method of claim 1, wherein the request includes initial credentials, and the encrypted token is only received if the initial credentials are authenticated by the installed device.

4. The method of claim 1, wherein the token includes at least one of an identifier of the installed device, an identifier of initial credentials used in the request, an identifier of the mobile device, a time or date of the request, or a level of access included in the request.

5. The method of claim 1, wherein the authentication process includes sending user credentials to the credentialing server for authentication.

6. The method of claim 1, wherein:
   the validation key to access the installed device is encrypted; and
   the authentication process includes sending user credentials to the credentialing server for authentication, and the validation key is only received if the user credentials are successfully authenticated and the validation key is successfully decrypted.

7. The method of claim 1, wherein the validation key is valid for only a predetermined amount of time after the request is sent.

8. The method of claim 1, wherein the validation key is a Rivest-Shamir-Adleman encryption key that can be used to access the installed device via secure shell protocol.

9. The method of claim 1, wherein the installed device is an Internet of things device in a building management system.

10. The method of claim 1, wherein the installed device stores a table of active authentication keys and data indicating expiration of each active authentication key.

11. A credentialing system, comprising:
    an installed device;
    a credentialing server; and
    a mobile device capable of communicating with the installed device and the credentialing server, the mobile device including a storage device comprising a credentialing application, an accessible memory comprising instructions of the credentialing application, and a processor configured to execute the instructions of the credentialing application to:
       send, to the installed device, a request for access to the installed device;
       receive, in response to the request, an encrypted token from the installed device, the encrypted token including a validation key;
       perform an authentication process with the credentialing server using the token, wherein the processor performs the authentication process by:
          sending the token to the credentialing server;
          decrypting the token at the credentialing server, decrypting the token including extracting the validation key from the encrypted token; and
       receive, from the credentialing server, a validation key corresponding to the installed device in response to decrypting the token; and
       communicate with the installed device using the validation key.

12. The credentialing system of claim 11, wherein the request includes initial credentials, and wherein the installed device stores a table of valid initial credentials.

13. The credentialing system of claim 11, wherein the request includes initial credentials, and the encrypted token is only received if the initial credentials are authenticated by the installed device.

14. The credentialing system of claim 11, wherein the token includes at least one of an identifier of the installed device, and identifier of initial credentials used in the request, an identifier of the mobile device, a time or date of the request, or a level of access included in the request.

15. The credentialing system of claim 11, wherein the authentication process includes sending user credentials to the credentialing server for authentication.

16. The credentialing system of claim 11, wherein:
the validation key to access the installed device is encrypted; and
the authentication process includes sending user credentials to the credentialing server for authentication, and the validation key is only received if the user credentials are successfully authenticated and the validation key is successfully decrypted.

17. The credentialing system of claim 11, wherein the validation key is valid for only a predetermined amount of time after the request is sent.

18. The credentialing system of claim 11, wherein the validation key is a Rivest-Shamir-Adleman encryption key that can be used to access the installed device via secure shell protocol.

19. The credentialing system of claim 11, wherein the installed device is an Internet of things device in a building management system.

20. The credentialing system of claim 11, wherein the installed device stores a table of active authentication keys and data indicating expiration of each active authentication key.

* * * * *